June 13, 1939.     D. HOLMES     2,162,171

HEEL BOLT

Original Filed Feb. 16, 1937

Inventor

D. Holmes

By C.A. Snow & Co.
Attorneys.

Patented June 13, 1939

2,162,171

UNITED STATES PATENT OFFICE 2,162,171

HEEL BOLT

Dobbin Holmes, Cordele, Ga.

Application February 16, 1937, Serial No. 126,083
Renewed January 6, 1939

1 Claim. (Cl. 85—32)

By way of explanation, it may be stated that the nut on the heel bolt which attaches a plow point, a cultivator point or other soil-engaging element to the stock of a plow heretofore has been so shaped that it cannot be tightened up properly if a plow scrape is used, an observation which will be better understood as the description progresses: and the present invention aims to provide, in combination with a soil-engaging element, a plow stock, plow scrape and heel bolt, a novel form of nut, adapted to be mounted on the bolt, and so constructed that the nut can be tightened up readily, even though the scrape might prevent the tightening of a nut of a construction different from that shown in the drawing and described hereinafter.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
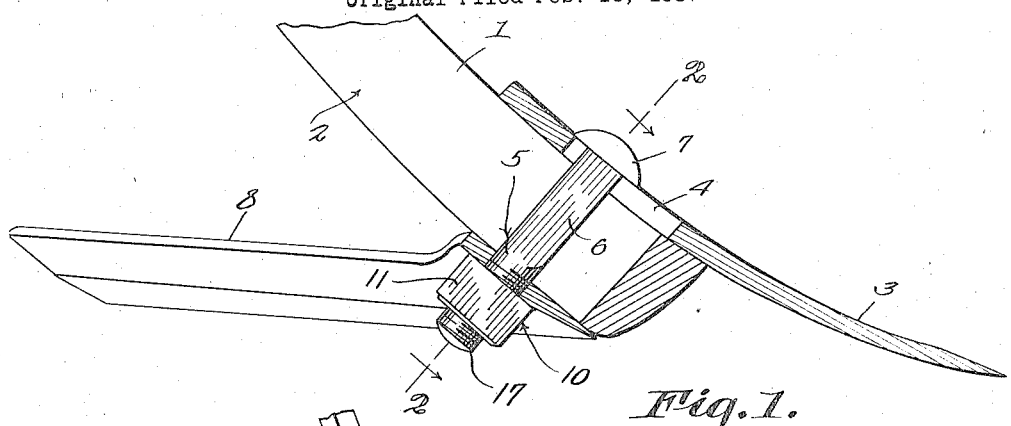
Fig. 1 shows in vertical longitudinal section, portions of a plow structure wherewith the device forming the subject matter of this application has been assembled.
Figure 2:
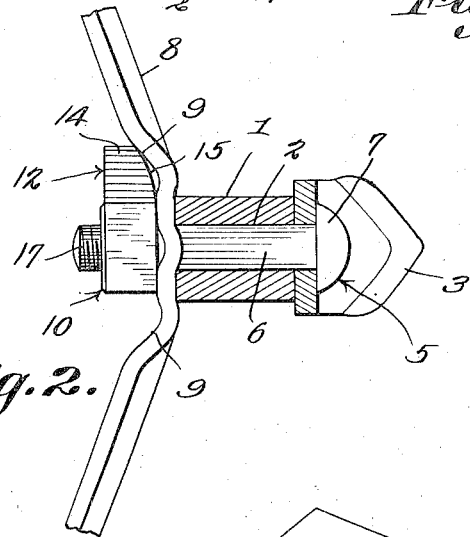
Fig. 2 is a section on the line 2—2 of Fig. 1.
Figure 3:
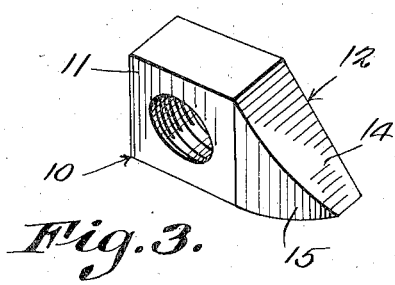
Fig. 3 is a perspective view of the nut.

The numeral 1 marks a plow stock having a vertically elongated slot 2. A plow point, cultivator point, or other soil-engaging element, is disposed in front of the plow stock 1, and is marked by the numeral 3, the part 3 having a vertically elongated slot 4 registering with the slot 2 of the plow stock 1. A bolt 5 is used to attach the soil-engaging element 3 to the plow stock 1, the bolt 5 having a squared portion 6 received in the slots 2 and 4, a head 7 cooperating with the soil-engaging element 3, and a threaded end 17, on which a nut is mounted.

The nut under consideration, so far as the present practice is concerned, is of the general type shown in Patent No. 205,992, and has a laterally extended arm of hook shape, the nut being tightened by knocking it around, rather than through the instrumentality of a wrench. It has been found that when a scrape is used, a common nut, of the variety hereinbefore discussed, is unsatisfactory because it cannot be tightened up sufficiently to hold the scrape in place, a portion of the nut striking the scrape, before the nut is firmly seated.

In the drawing, the scrape is marked by the numeral 8, and the central portion of the scrape rests against the rear edge of the plow stock 1, the scrape having forwardly converging portions 9 disposed closely adjacent to the stock 1. I propose to provide a nut 10 comprising a rectangular body 11 having a triangular offset or arm 12, one edge surface of which, marked by the numeral 14, is inclined to the end that blows may be applied more readily to the nut, in order to rotate and tighten it. The surface of the offset 12 which is adjacent to the inner end surface of the nut 10 is backwardly inclined, as shown at 15. This surface will clear the parts 9 of the plow scrape 8 and enable the nut to be tightened up sufficiently so that it will hold the scrape in place.

Having thus described the invention, what is claimed is:

A nut for use in holding a plow scrape on a plow stock, the nut being of rectangular form and being provided upon one edge with a single, approximately triangular, edge offset, which is as long as said edge, the outer edge of the offset being inclined, from one corner of the nut to the outer extremity of the offset, in a direction in which the nut is tightened when it is rotated, the projecting dimension of the offset being less than the breadth of the nut, the edge surface of the offset which is adjacent to the inner end surface of the nut being outwardly inclined with respect to said end surface, the outer surface of the projection being in the same plane with the outer end surface of the nut, the projection being of the same thickness as the nut, where the projection is joined to the nut.

DOBBIN HOLMES.